(12) United States Patent
Ford

(10) Patent No.: US 6,325,408 B1
(45) Date of Patent: Dec. 4, 2001

(54) AIR BAG ATTACHMENT ARRANGEMENT

(75) Inventor: Brian C. Ford, Mt. Clemens, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/571,255

(22) Filed: May 15, 2000

(51) Int. Cl.[7] .................................................. B60R 21/16
(52) U.S. Cl. ........................................ 280/728.2; 280/731
(58) Field of Search ................................ 280/731, 728.2, 280/728.1, 743.1; 403/252, 256, 321, 315, 316, 317, 353

(56) References Cited

U.S. PATENT DOCUMENTS

| | | | |
|---|---|---|---|
| 3,602,284 | * 8/1971 | Smith | 403/252 |
| 4,392,759 | * 7/1983 | Cook | 403/317 X |
| 4,473,316 | * 9/1984 | Welch | 403/353 X |
| 5,005,860 | 4/1991 | Mori et al. | 280/731 |
| 5,333,897 | 8/1994 | Landis et al. | 280/728 |
| 5,380,037 | * 1/1995 | Worrell et al. | 280/728.2 |
| 5,403,033 | 4/1995 | Koma | 280/728 |
| 5,423,568 | * 6/1995 | Zushi et al. | 280/728.2 |
| 5,590,900 | 1/1997 | Duran et al. | 280/728.2 |
| 5,599,039 | 2/1997 | Goss et al. | 280/728.2 |
| 5,630,611 | 5/1997 | Goss et al. | 280/728 |
| 5,639,113 | 6/1997 | Goss et al. | 280/728.2 |
| 5,685,557 | 11/1997 | Persson et al. | 280/728.2 |
| 5,738,370 | * 4/1998 | Hosoi et al. | 280/731 |
| 5,755,458 | 5/1998 | Donovan | 280/728.2 |
| 5,788,268 | 8/1998 | Goss et al. | 280/728.2 |
| 5,803,646 | * 9/1998 | Weihrauch | |
| 5,882,053 | * 3/1999 | Bekins et al. | |
| 5,979,933 | 11/1999 | Murar et al. | 280/731 |
| 6,016,674 | 1/2000 | Yang | 70/209 |
| 6,029,992 | 2/2000 | Vendely et al. | 280/728.2 |
| 6,109,819 | * 8/2000 | Welsh | 403/353 |
| 6,196,573 | * 3/2001 | Worrell et al. | 280/728.2 |

FOREIGN PATENT DOCUMENTS

563943  * 10/1993 (EP) .

* cited by examiner

Primary Examiner—Brian L. Johnson
Assistant Examiner—Bryan Fischmann
(74) Attorney, Agent, or Firm—Markell Seitzman

(57) ABSTRACT

An attachment arrangement includes an air bag module (12) having an engagement member (14), a receiver (16), and a fastener (18). The receiver is located within a vehicle component such as a steering wheel in which the mounting of an air bag is desired. The engagement member (14) extends from the module (12) and fits within the receiver (16) such that a groove (38) in the engagement member is engageable by the fastener (18). The fastener (18) preferably includes a pair of substantially parallel wires (38) which form a first substantially annular segment (40) and a locking segment (44). The first annular segment (40) is proportioned to receive the engagement member (14). The locking segment (44) is sized to engage the groove (38). The fastener (18) slidably engages and disengages the engagement member (14) to lock and unlock the module (12) in response to sliding the fastener (18) relative to the retainer (16).

37 Claims, 12 Drawing Sheets

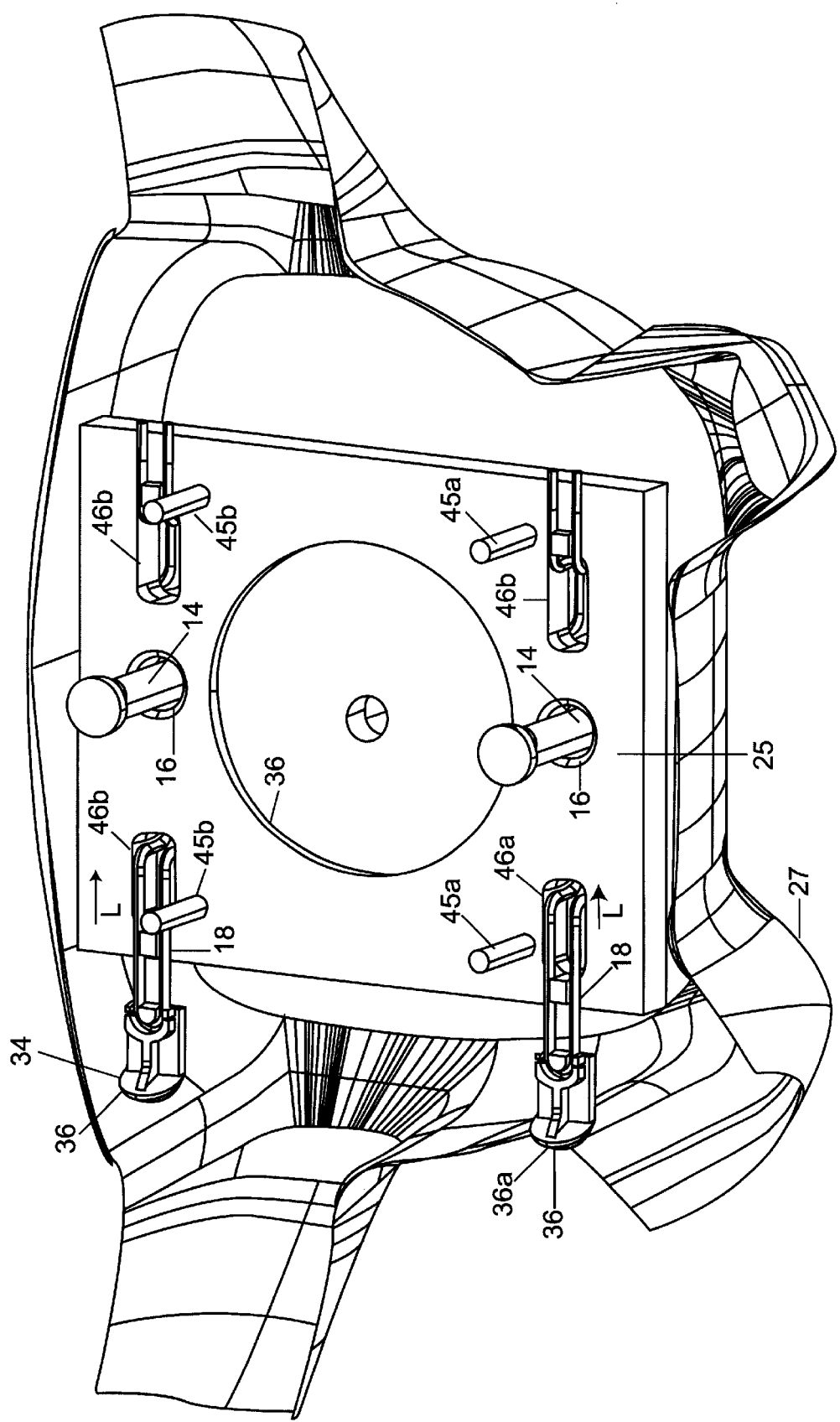

AIR BAG ATTACHMENT ARRANGEMENT

BACKGROUND OF THE INVENTION

The present invention relates to an air bag module, and more particularly to an air bag attachment arrangement that permits the secure mounting of an air bag module without the necessity of separate tools or fasteners.

An air bag module is commonly formed as a separate and independent unit from the steering wheel. The cover, air bag, and inflator are each securely anchored to a base plate of the module such that the module can be installed in the steering wheel as a separate complete module.

Preassembled, inflatable, air bag modules are typically delivered to vehicle manufacturers and then mounted as a unit to a steering wheel along the vehicle assembly line. The module typically fits within a cavity in the steering wheel and is retained therein by clips and/or fasteners.

In a known air bag mounting arrangement weld or press nuts are installed on the air bag module. During assembly, the airbag module is loosely mounted to or placed upon the steering wheel hub and thereafter, fasteners are inserted through designated locations on the steering wheel hub and are engaged with the respective nuts provided on the air bag module. The fasteners are screwed into place to interconnect the air bag module to the steering wheel hub. This can be time consuming and difficult in that the fastener members must be precisely placed through the steering wheel and carefully screwed into place to ensure that the air bag module is properly secured to the steering wheel hub. Accordingly, it is desirable to provide a simple yet secure attachment arrangement that requires a minimum of separate fasteners and tools.

SUMMARY OF THE INVENTION

The air bag module attachment arrangement according to the present invention generally includes an air bag module having an engagement member, a receiver, and a fastener. The receiver is located within a vehicle component such as a steering wheel in which the mounting of an air bag is desired.

The engagement member extends from the module and is preferably a cylindrical post having a groove. The engagement member fits within the receiver such that the groove is engageable by the fastener. An aperture is located in the steering wheel to access the fastener, which slides with a button to lock and unlock the engagement member.

The fastener preferably includes a pair of substantially parallel wires, which form a first substantially annular segment and a second substantially annular segment with a locking segment therebetween. The first annular segment is proportioned to receive the engagement member. The second annular segment is positioned so that it interferes with a feature protruding from the rear of the steering wheel so that the fastener will not move out of position during vibration. The locking segment is sized to engage the groove. The fastener slidably engages and disengages the engagement member to lock and unlock the module in response to sliding the fastener relative to the retainer. Once the engagement member is located within the receiver, the module need only be pushed into the steering wheel assembly. Should the fastener be improperly positioned, the engagement member will not fully seat within the receiver. Thus, a visible indication is immediately provided as the engagement member can not be properly seated and the fastener extends from the steering wheel if the module is improperly installed. The possibility of an improper module installation is thereby greatly reduced. To remove the module, the fastener need only be slid in a reverse direction, that is, outwardly.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 4A is a top view of a steering wheel assembly with an air bag module engagement member locked into a receiver.

DETAILED DESCRIPTION OF THE PREFERRED EMBODIMENT

Figure 1A:
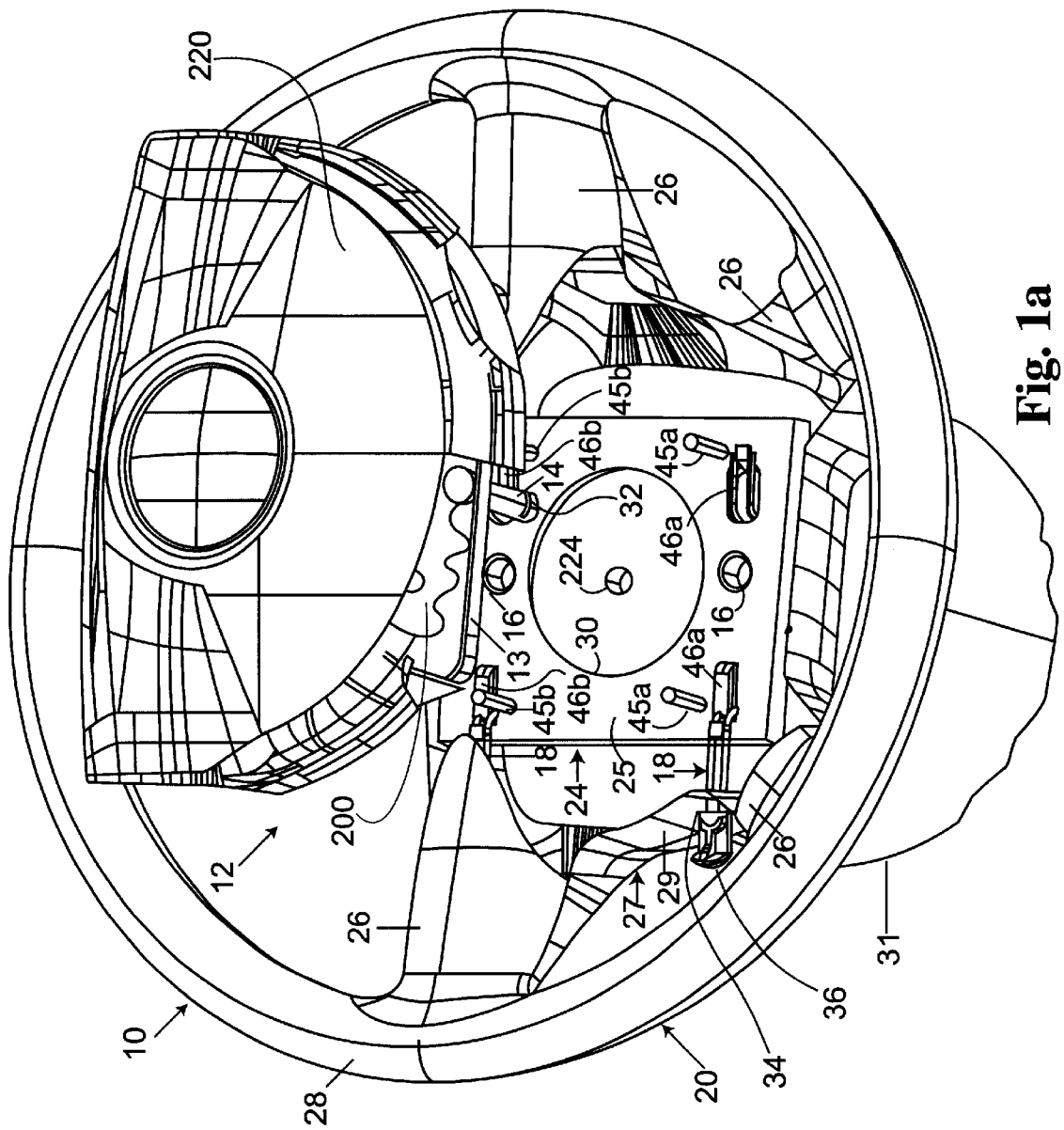
FIG. 1A is a very simplified exploded view of an air bag assembly for a vehicle component designed according to the present invention.

FIG. 1A illustrates an air bag assembly 10 for a vehicle. The air bag assembly 10 includes an air bag module 12 having two engagement members 14 (only one of which can be seen in FIG. 1). While the illustrated embodiment shows two such engagement members, a single engagement can be used. Each engagement member is secured to a housing portion 13 of the air bag module. The module may include one or more housing portions. While not illustrated in FIG. 1A, the air bag module 12 will, in addition to the housing portions 13, generally further include an air bag 200 and an inflator 210 and a cover 220. Two receivers 16 and two fasteners 18 are located within a vehicle component such as a steering wheel assembly 20. It should be understood that a steering wheel assembly includes many other components, which are not shown in FIG. 1A. Although a steeling wheel assembly 20 is illustrated in the disclosed embodiment, it should be realized that other mounting locations can benefit from the attachment arrangement of the present invention.

Figure 6:
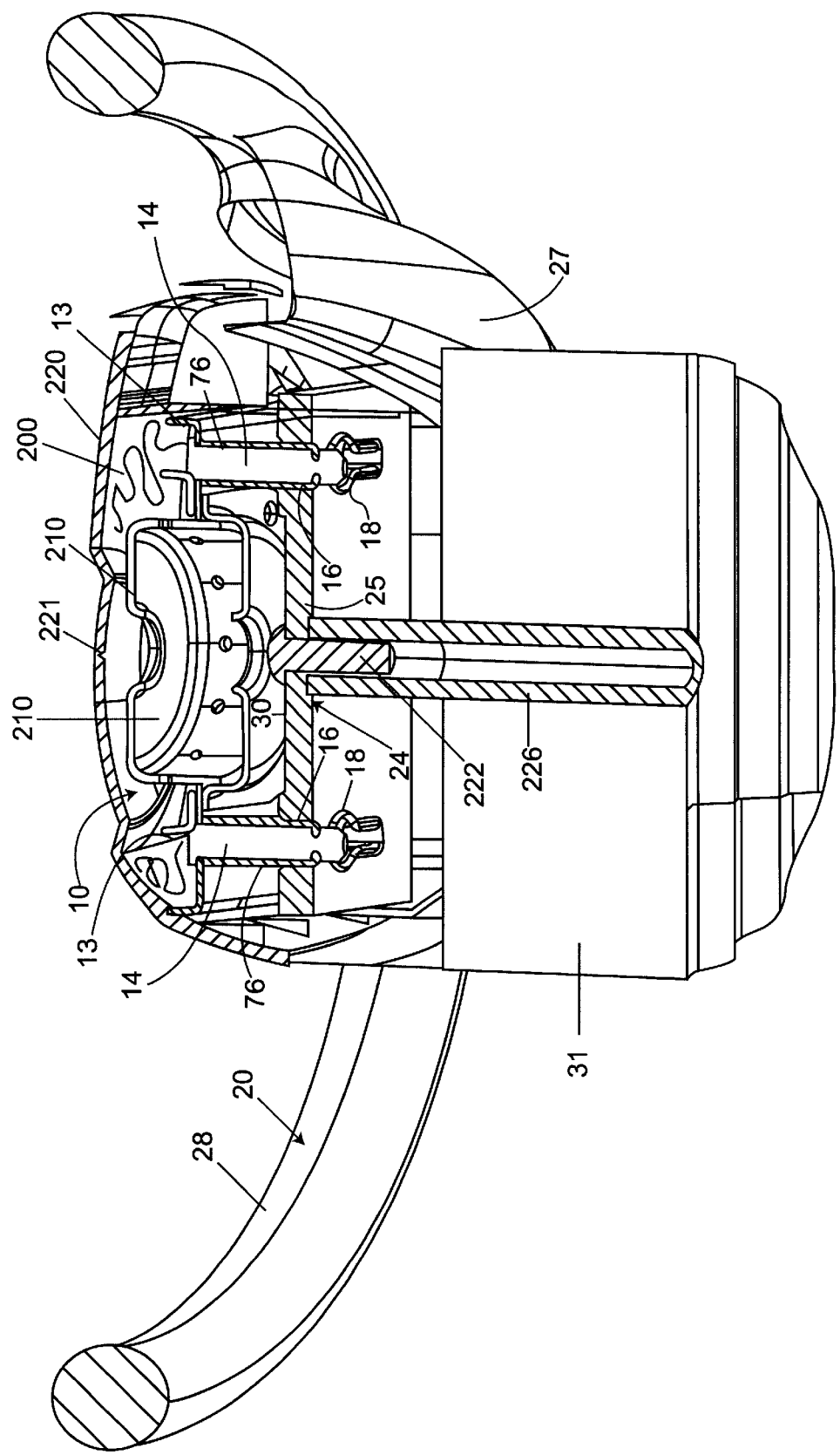
FIG. 6 shows a cross-sectional view of the air bag module on the hub and steering column.

The steering wheel assembly 20 further includes a central hub 24, which is mounted on or formed as part of a steering column 31. An outer circular rim portion 28 of the steering wheel is connected to the hub 24 by spokes 26. As illustrated, the hub 24 comprises a plate 25 with an optional cavity 30. As can be seen in FIG. 6 the bottom of an inflator is received within the cavity 30. This configuration reduces the depth of the module. The receivers or holes 16 are located on diametrically opposite sides of the plate 25 about the cavity 30. Positioned on the under side of the steering wheel 20 is a shroud or lower cover 27, of generally known construction. The shroud includes a side wall 29, which envelops the hub 24 of the steering wheel. The wall 29 includes two small openings 34 (one of which can be seen in FIG. 1A) into which is received a corresponding cap 36, which is associated with each fastener 18.

Figure 1B:
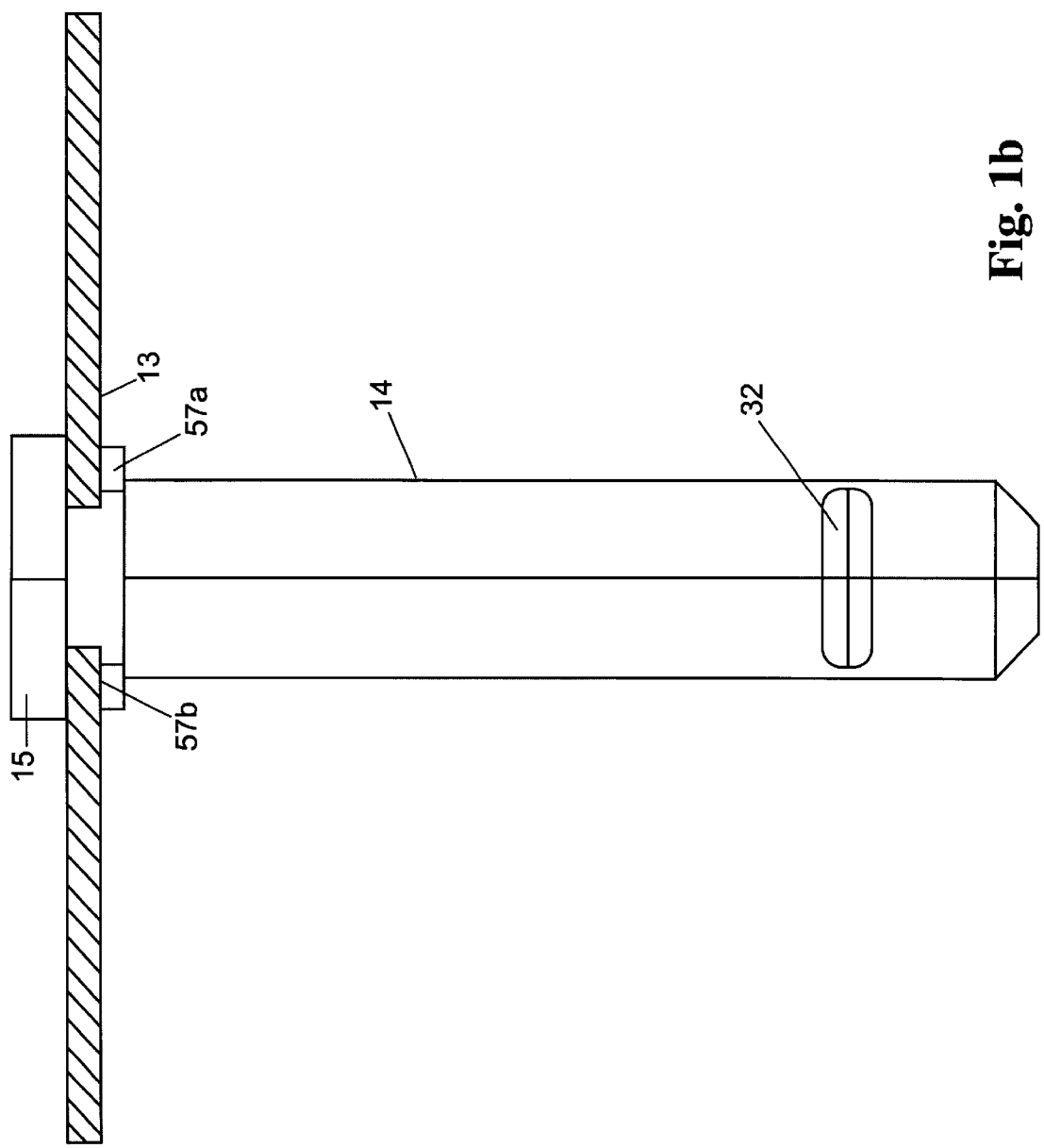
FIG. 1B is a partial cross-sectional view of a housing portion and also shows an engagement member inserted therein.
Figure 1C:
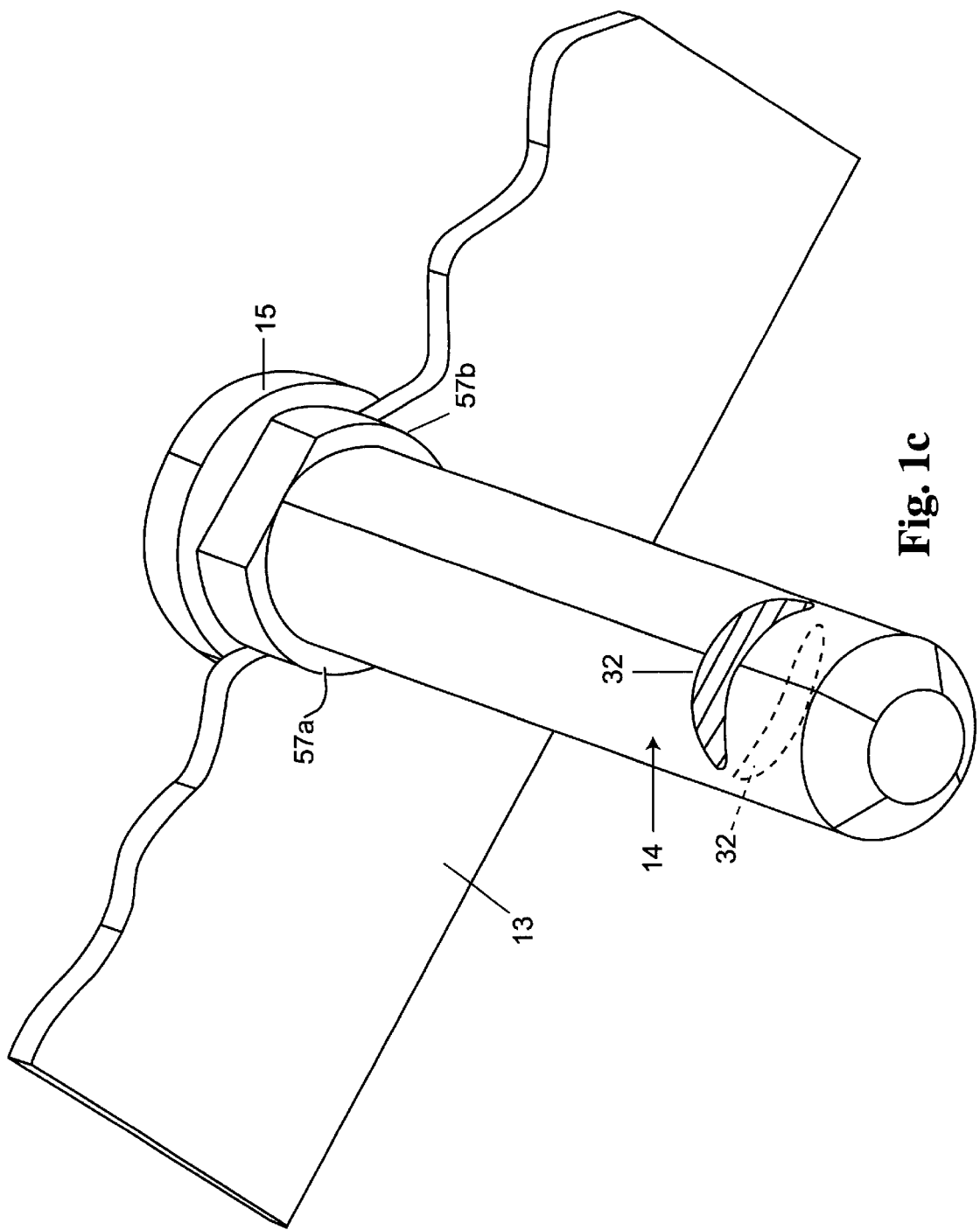
FIG. 1C is an isometric view of the engagement member within the housing portion.
Figure 4B:
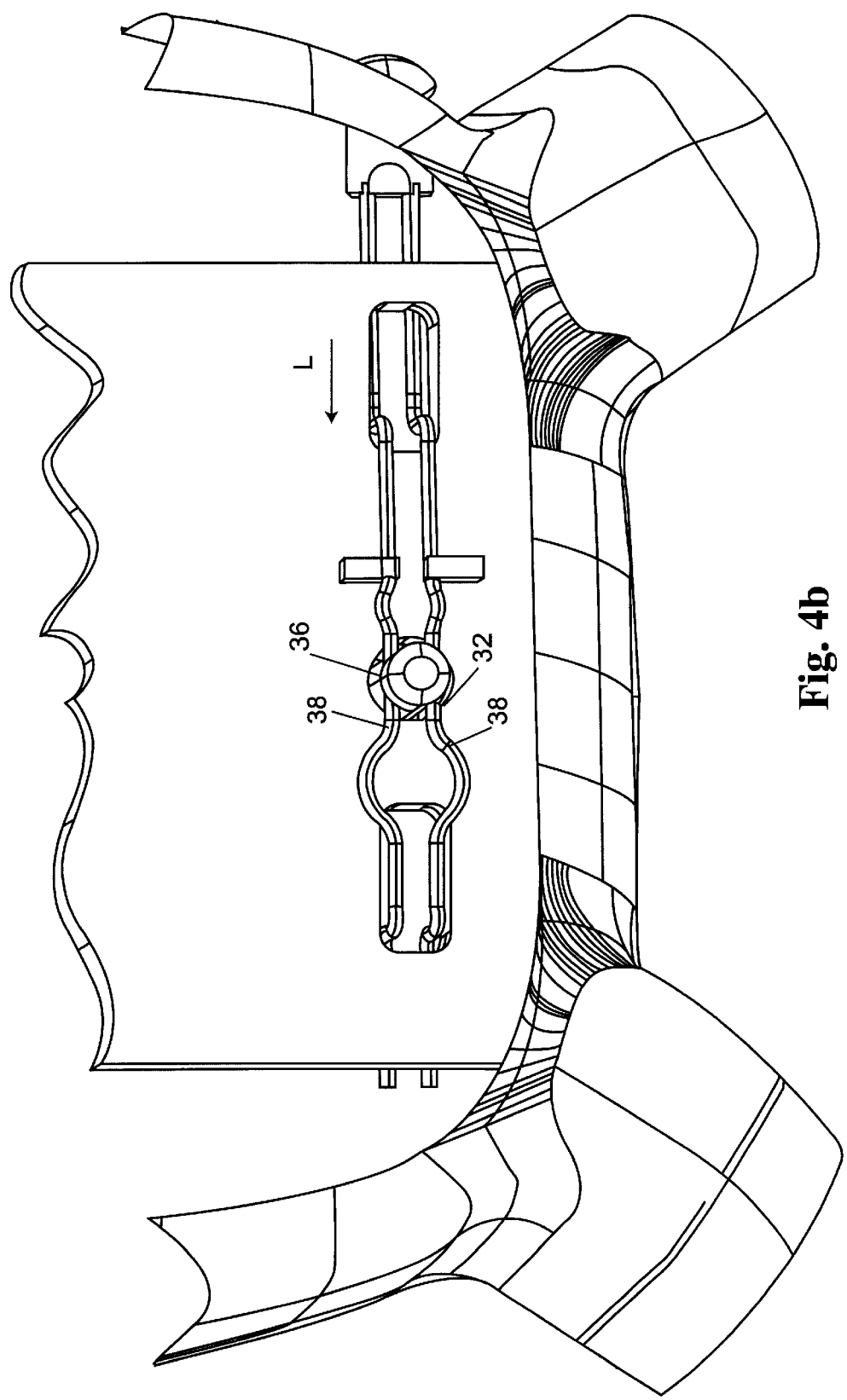
FIG. 4B is a bottom view of the steering wheel assembly of FIG. 4A illustrating the air bag module engagement member locked into a receiver.

Each engagement member 14 extends from a housing portion 13 of the module 12 and is preferably a cylindrical post having opposing grooves 32. As can be appreciated, a single annular grove encircling the post can also be used. The engagement members 14 can be formed integrally with the module 12, or can be manufactured as a separate component. As a separate component, each engagement member 14 preferably includes a head 15, which retains the engagement member 14 within an engagement member aperture 57b in housing portion 13 (FIG. 1B). Furthermore, so that the grooves 32 in the engagement member 14 are properly oriented relative to the fasteners in the hub, the engagement member is keyed to the housing portion 13 to control its relative orientation. As illustrated in FIGS. 1B and 1C, the engagement member 14, below its head 15, includes a D-shaped collar 57a, which corresponds to a D-shaped aperture 57b in the housing portion 13. After the engagement member is positioned in the air bag module 12, the collar 57a is swaged against the head 15 entrapping the housing portion 13 therebetween. Each engagement member 14 fits within a respective receiver 16 such that its groove 32 is engageable by a respective fastener 18 (FIG. 4B). Each receiver 16 in the disclosed embodiment is a complementary cylindrical aperture that has a diameter that is slightly larger than that of the cylindrical post-like engagement member 14. As described below, each fastener 18 is accessible via the cap 36 in the side of the shroud 27. Additionally, each fastener 18 is slidably secured to the hub 24. As will be further described below, each fastener 18 slides transversely relative to its engagement member 14 to lock and unlock the module 12 to the steering wheel.

Each fastener 18 preferably includes a pair of parallel wires or wire legs 38. In the disclosed embodiment, the parallel wires 38 are formed from a single wire that has been bent into a U-shape. Each fastener 18 includes a center portion 17 and end portions 19 and 21. The wires 38, in the center section, are formed into a first substantially annular segment 40, a second substantially annular segment 42 and a locking segment 44 located therebetween. The wires 38 in the end portions 19 and 21 are bent and elevated above the center section. As can be seen, the end 19 includes a U-shaped loop 19a. The cap 36, mentioned above, includes a mechanism of securing the U-shaped end to itself, such as a groove 36a into which is received the loop 19a. In this manner the fastener 18 is movable with the button 36. The first annular segment 40 is sized to be slightly greater than the engagement member 14 so that the engagement member 14 can be inserted therein with no insertion force or a nominal force between the engagement member and first annular segment 40. The locking segment 44 is sized so that the distance between the wires 38 allows each wire 38 to slide easily into a corresponding groove 32. As will be seen below, the second annular segment 42 prevents the wires from dislodging from the grooves 32.

As will be further described below, the locking segment 44 locks into the groove 32 and retains the engagement member and thus the module 12 to the hub 24. Although the fastener 18 in the disclosed embodiment includes a first annular segment which receives the engagement member, it should be understood that other configurations complementary to the shape (circular, rectangular, oval, triangular) of the engagement member can also be used.

Figure 2A:
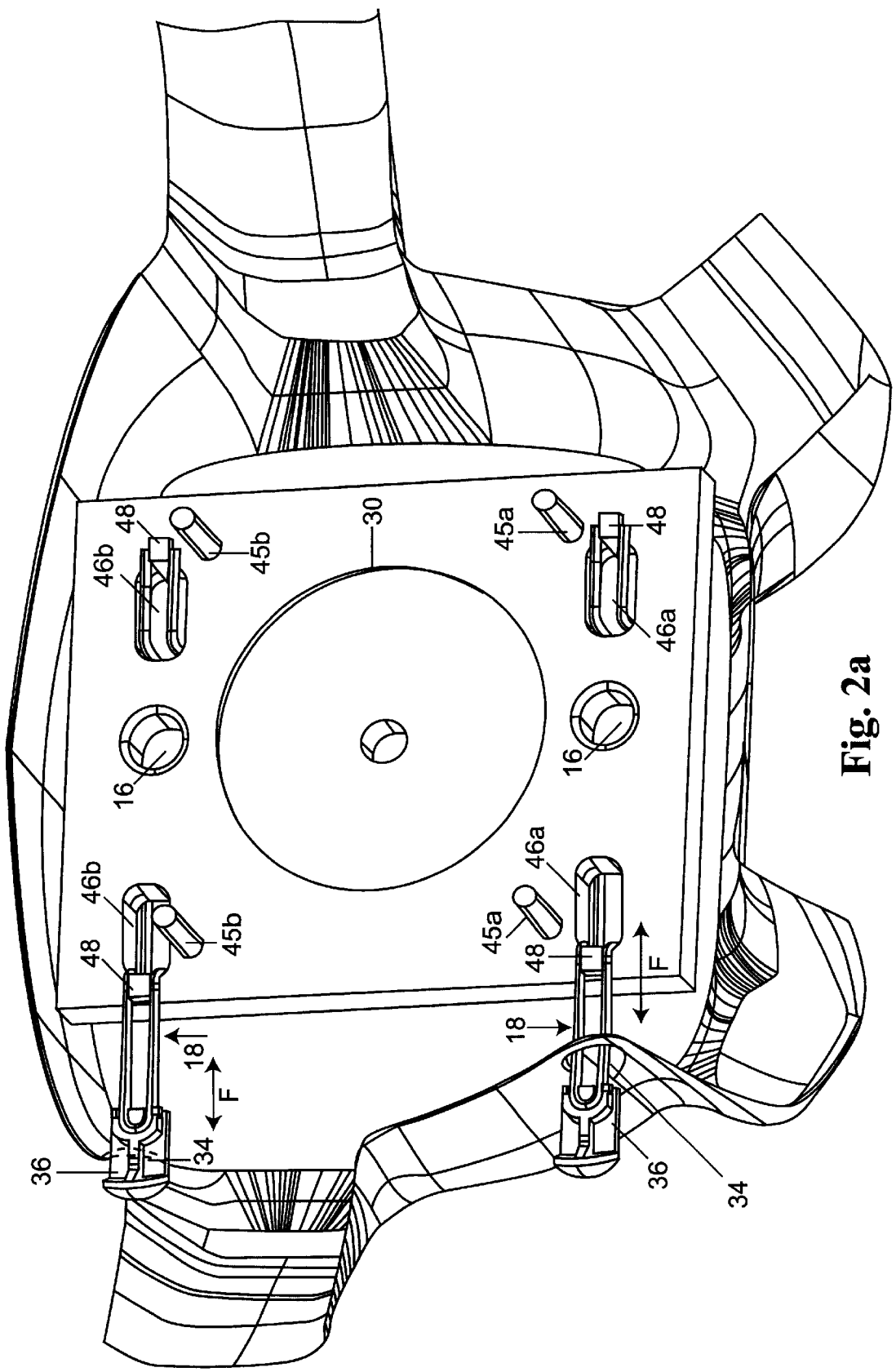
FIG. 2A is a top view of a hub of a steering wheel assembly in a condition to receive an air bag module.
Figure 2B:
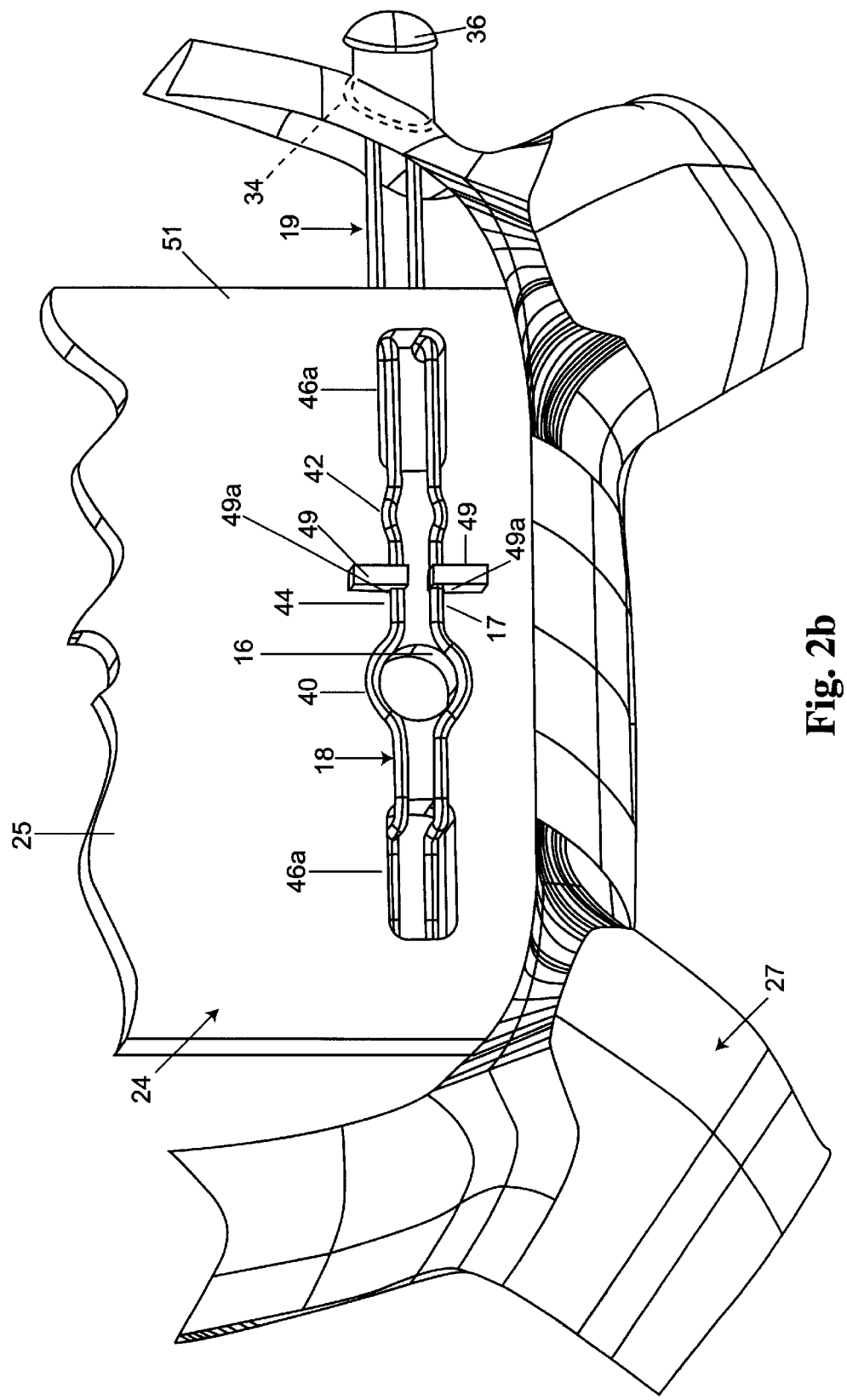
FIG. 2B is a bottom view of a hub of the steering wheel assembly of FIG. 2A in a condition to receive the air bag module.

The hub 24, (as seen in FIGS. 1A, 2A and 2B) in addition to the two receivers 16, also includes two sets of pins which function as stand-offs 45a and 45b and fastener guide slots 46a and 46b. As can be appreciated, if only one fastener is used, then only one set of pins and one set of guide slots is needed. The standoffs 45a and 45b support the module 12 and also prevent it from rocking. Each set of fastener guide slots 46a and 46b retains a corresponding fastener 18 to the hub 24 and permits the fastener 18 to slide relative to a respective receiver 16.

Referring to FIG. 2A, the cavity 30 and the hub 24 are illustrated in a condition to accept the module 12. The hub proximate each set of guide slots 46a and 46b preferably includes dividers 48. The dividers 48 extend upwardly from the plane of the plate 25 and fit between and space the parallel wires 38 of the fastener 18. Each fastener 18 is configured to fit and slide (in the direction of double-headed arrow F) within its corresponding set of slots 46a and 46b. As can be appreciated, FIG. 2A is a view looking down on the hub 24. In this configuration, each button 36 has been pulled outwardly (to the left) from its respective opening 34.

Referring to FIG. 2B, a bottom view of the hub 24 is illustrated showing the lower portion of the hub and the fastener 18 mounted thereon. Only one fastener 18 is shown. The first annular segment 40 of the fastener 18 is aligned with its corresponding receiver 16. As illustrated, the first annular segment 40 is of a diameter greater than the receiver 16 to allow easy insertion of the engagement member 14. While not illustrated, the other fastener will take the same relative orientation to its retainer 16 and slots 46b.

As also shown in FIG. 2B, the illustrated fastener 18 is further retained by a pair of spaced protrusions 49 which at least partially surround the wires 38 in the center portion 17 of the fastener 18. The protrusions 49 extend from a bottom 51 of the hub 24 intermediate the guide slots 46 and include a guide slot 49a through which the wires 38 slide. The protrusions 49 and guide slots 46 assist in the guidance and retention of the fastener 18.

Figure 1D:
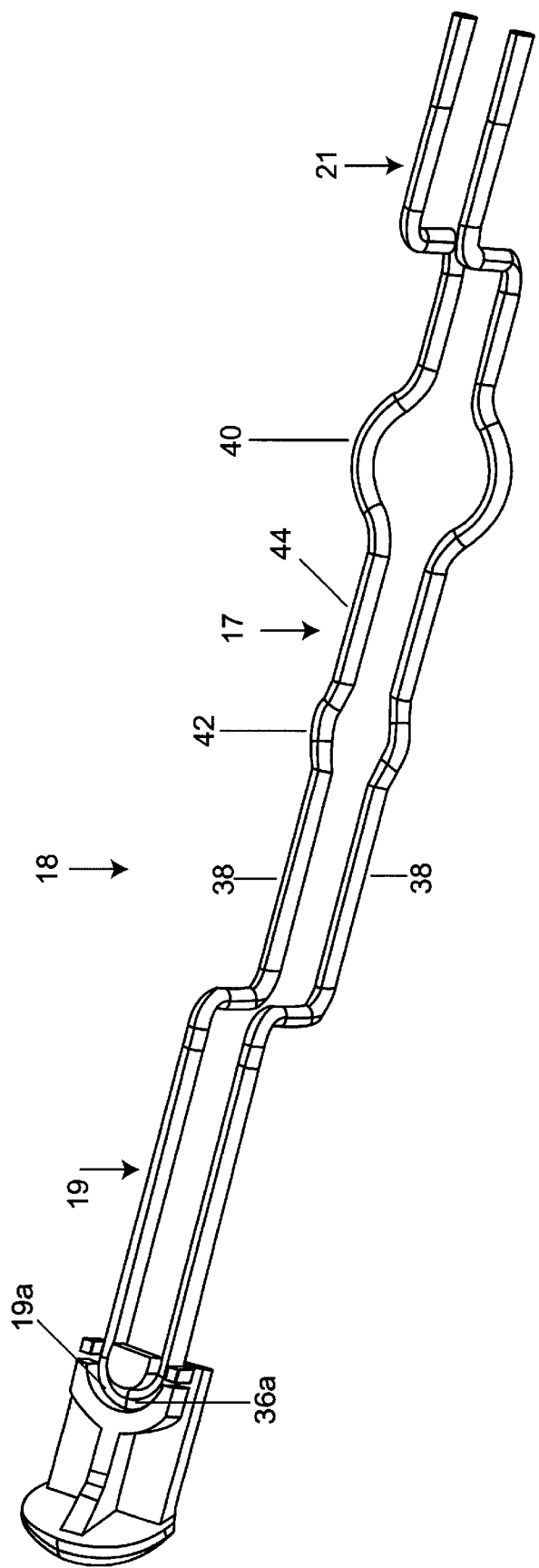
FIG. 1D is an isometric view of an exemplary fastener member.
Figure 5:
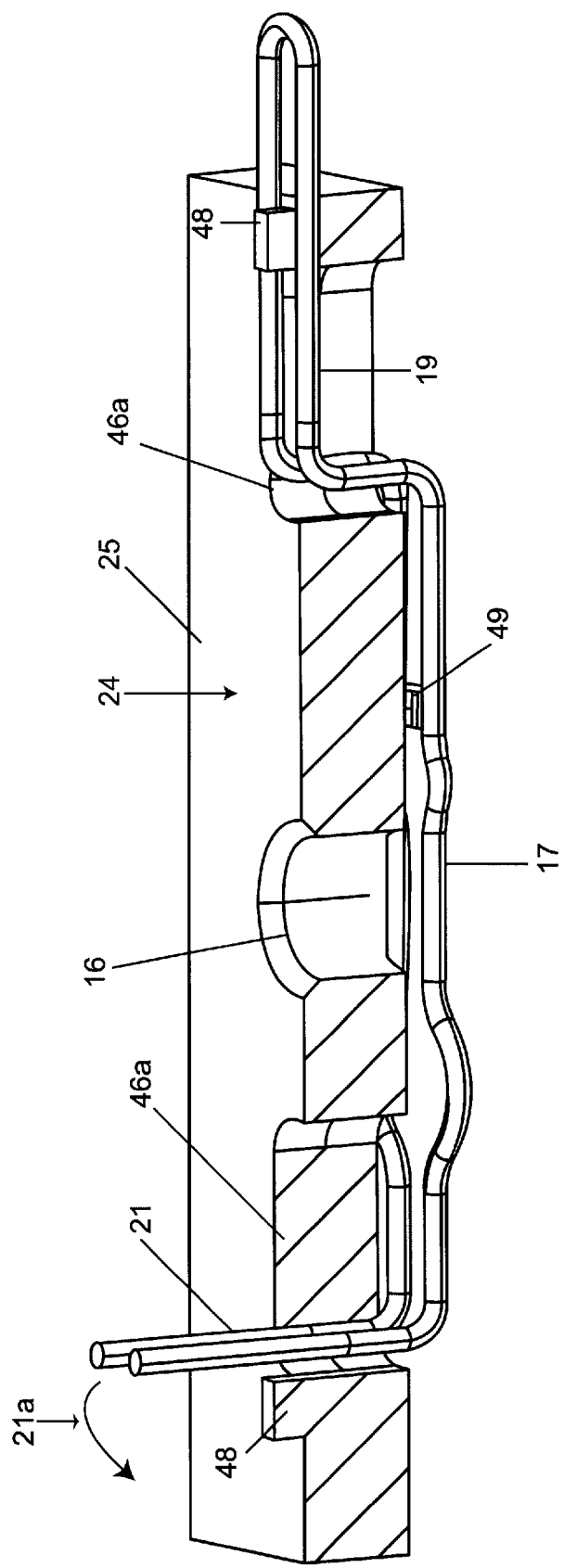
FIG. 5 shows the preferred method for installing the fastener in the steering wheel hub.

Reference is again made to FIG. 1D. This figure illustrates the configuration of one of the fasteners 18 in its installed configuration in the hub 24. As mentioned above, the fasteners 16 retain the module to the steering wheel. As such, each fastener 18 is made from a relatively high gauge wire. If the gauge of the wire 38 is suitably chosen so that the fastener 18 is sufficiently compliant, it will be possible to snake a pre-formed fastener 18 of the shape as shown in FIG. 1D through its guide openings (46a or 46b). If the fastener 18 is made of thicker wire it will not be possible to snake the fastener though its guide openings. Reference is briefly made to FIG. 5, which shows an alternate configuration of a fastener 18 prior to its final assembly in the plate 25. One of the end portions, such as 21 of the fastener 18, extends perpendicularly from the center portion 17. The other end portion such as 19 is inserted through its corresponding guide slot 46a and positioned about its divider 48 and the wires on the center portion 17 are positioned in the slots 49a. In this configuration, the end portion 21 will extend through the other guide slot 46a. Thereafter, the wires 38 in the end portion 21 are bent over in the direction of arrow 21a and positioned about the other divider 48 thereby achieving the desired configuration and placement of the fastener 18.

As shown in FIG. 2B, the protrusions 49 are separated by a distance less than the outer diameter of the second substantially annular segment 42. When the cap 36 is pushed inwardly the wires 38 forming the larger diameter segment 42 cam against the sides of the protrusions 49 forcing the wires 38, especially the wires 38 in the center portions 17 of the fastener 18, to move inwardly. This condition is shown in FIGS. 4B. When a cap 36 is moved outwardly to the position shown in FIG. 2B the natural outward spring of the wires 38 will reestablish the illustrated configuration. The second substantially annular segment 42 must be flexed inward from its free state to pass by the protrusions 49. When the second substantially annular segment 42 is located on one side of the protrusions 49 (FIG. 2B) the first annular segment 40 of the fastener 18 is aligned with the receiver 16. When the second substantially annular segment 42 is located on the opposite side of the protrusions 49 (FIG. 4) the locking segment 44 is aligned with the receiver 16. The protrusions 49 thereby assist in retaining the fastener 18 in the released (FIG. 2B) or the locked (FIG. 4B) position.

Figure 3A:
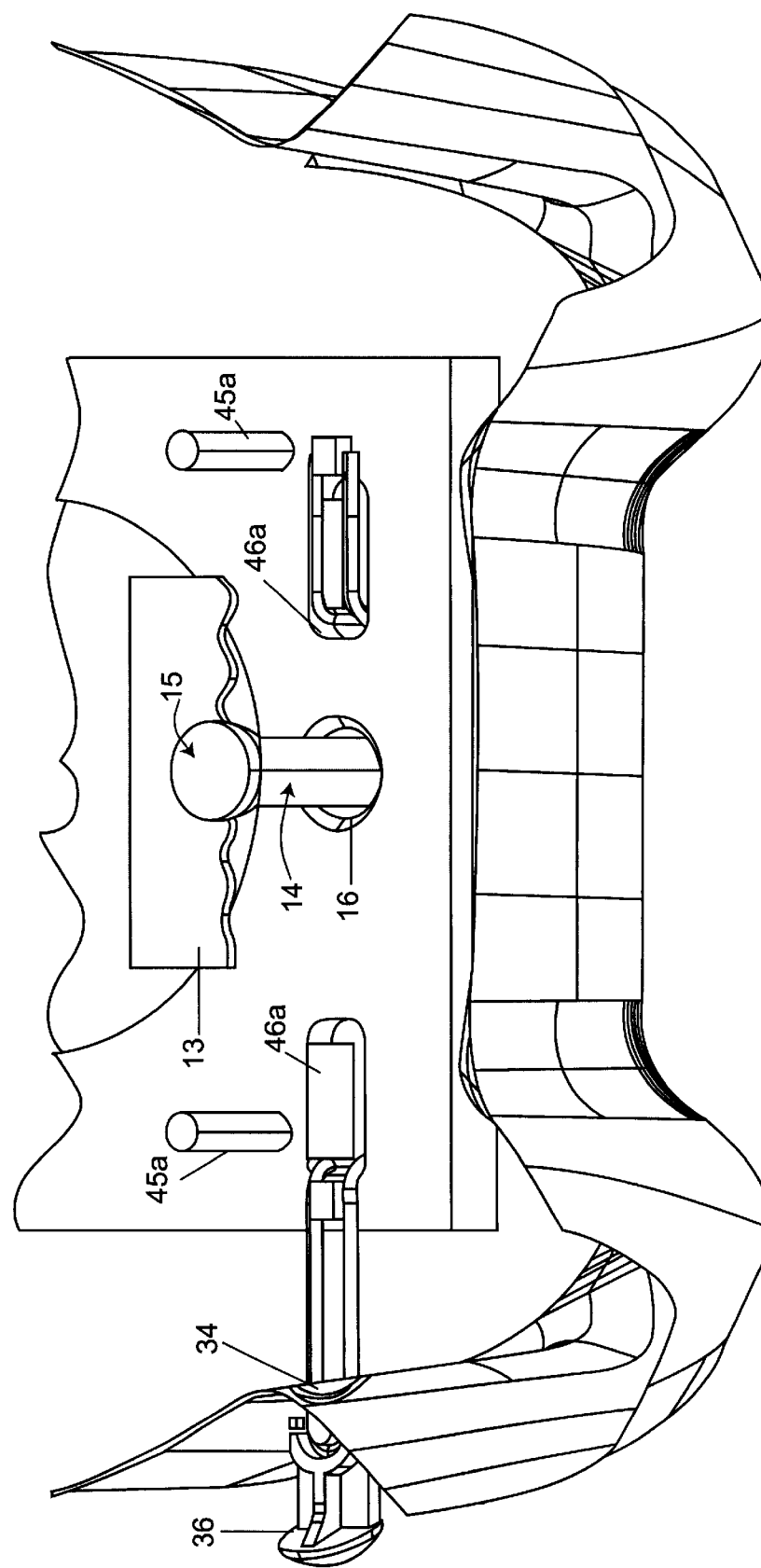
FIG. 3A is a top view of a steering wheel assembly with an air bag module engagement member located in a receiver.
Figure 3B:
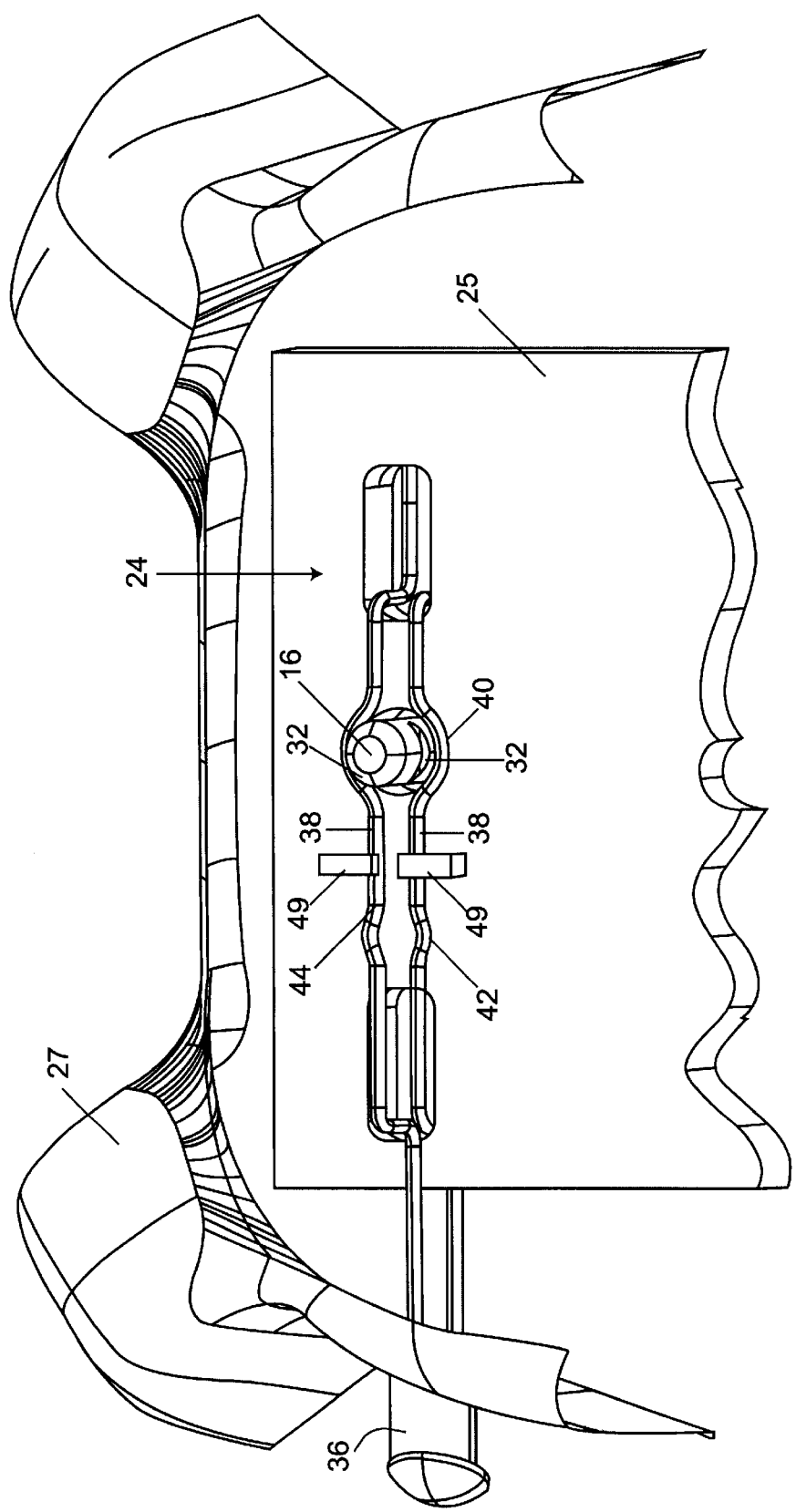
FIG. 3B is a bottom view of the steering wheel assembly of FIG. 3A illustrating the engagement member located in a receiver.

Reference is made to FIG. 3A which is substantially the same as FIG. 2A and also shows one of the fasteners 18 in its unlocked position. For the purpose of clarity, most of the module 12 is not shown in FIG. 3A. Only a portion of the housing portion 13 with one engagement member 14 is shown pushed through its corresponding receiver 16. Referring to FIG. 3B, which is a view from the underside of the hub 24, an engagement member 14 is illustrated as properly positioned within the first annular segment 40 of the fastener 18. Preferably, when the module is correctly seated, each groove 32 in the engagement member 14 is aligned with one of the opposing wires 38.

Referring to FIG. 4A, the fastener 18 (and cap 36) has been moved in the direction of arrow L to lock the engagement member 14 and module 12 to the steering wheel assembly 30. The cap 36b, of the button 36, is now flush with the wall of the shroud 27.

Referring to FIG. 4B, by moving the fastener 18 in the direction of arrow L as mentioned above, the first substantially annular segment 40 has been slid away from the engagement member 14 such that the locking segment 44 engages the groove or grooves 32. The second substantially annular segment 42 is pushed past the protrusions 49. After the second substantially annular segment 42 is moved past the protrusions 49, the protrusions 49 assure that the locking segment 44 remains aligned with the receiver 16. The engagement member 14 is now locked into the receiver 16 by the fastener 18 to securely retain the module 12 within the steering wheel assembly 20.

To remove the module 12, the cap 36 and attached fastener 18 arc pulled outwardly, in a direction opposite arrow L, such that the second substantially annular segment 42 is flexed inward from its free state to pass by the protrusions 49. The first substantially annular segment 40 is now again aligned with the receiver 16 and the module 12 can be removed.

Should one of the fasteners 18 be improperly positioned to obstruct at least one of the receivers 16, the engagement member 14 will be prevented from being fully seated within the receiver 16. Thus, the present invention provides a visible indication of this mismatch. The possibility of improper module 12 installation is thereby greatly reduced.

Reference is briefly made to FIG. 6, which is an isometric, partial cross-sectional view of the steering wheel and also shows the module 10 installed in the steering wheel 20. Additionally, a fastener 222 extends through opening 224 in the hub 24 and into the top of the hollow steering shaft 226. The fastener 222, of known variety, can be keyed to the shaft 226 to insure that the steeling wheel is installed in the correct orientation. Additionally, both the fastener and shaft can include splines (not shown) to affect a position connection therebetween. As can also be seen from FIG. 6 the inflator 210 is seated in the cavity 30 and the air bag 200 is folded about the inflator and located beneath the cover 220. The inflator is shown as a hollow cylinder and does not show its propellant or initiator (squib). The cover is secured to the housing portion 13 in a known manner. The cover 220 also preferably includes a tear seam 221, which is torn apart as the air bag inflates.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An air bag assembly (10), comprising:
   an air bag module (12);
   an engagement member (14) extending from said air bag module (12);
   a receiver (16) in a vehicle steering wheel (20) for receipt of said engagement member; and
   a fastener (18) being linearly slidable between a first position and a second position relative to said receiver (16), said fastener (18) locatable in said first position which provides a clearance to accept said engagement member (14) when located at said second position to lock said air bag module (12) to said receiver (16).

2. The air bag assembly (10) as recited in claim 1, wherein said engagement member (14) includes a groove (32) to receive said fastener (18) when said fastener (18) is located in said second position.

3. The air bag assembly (10) as recited in claim 1, wherein said fastener (18) includes a pair of parallel wires (38).

4. The air bag assembly (10) as recited in claim 3, further comprising a first guide slot (46a) and a second guide slot (46b), said fastener (18) guided through each of said first (46a) and second (46b) guide slots, such that said fastener (18) is located adjacent said receiver (16).

5. The air bag assembly (10) as recited in claim 4, further comprising a divider (48) located adjacent each of said first (46a) and second (46b) guide slots, said divider (48) located between said pair of wires (38).

6. The air bag assembly (10) as recited in claim 1, wherein said fastener (18) includes a pair of parallel wires (38), said parallel wires (38) defining a first substantially annular segment (40), a second substantially annular segment (42), and a locking segment (44) therebetween.

7. The air bag assembly (10) as recited in claim 6, wherein said fastener (18) is retained in said first position and said second position by interaction between said second substantially annular segment (42) and a pair of protrusions (49) adjacent said fastener (18).

8. The air bag assembly (10) as recited in claim 7, wherein said first substantially annular segment (40) provides a clearance to receive said engagement member (14) when located in said first position and said locking segment (44) engages said groove (32) when located in said second position.

9. The air bag assembly (10) as recited in claim 1, wherein said engagement member (14) is a separate component for insertion in an aperture (17) of said air bag module (12).

10. The air bag assembly (10) as recited in claim 9, wherein said engagement member (14) includes a D-shaped collar (57a) receivable within said aperture (57b) of the airbag module (12), such that said D-shaped collar (57a) is subsequently swaged into said aperture (57b).

11. An airbag assembly as recited in claim 1, wherein said fastener providing said clearance, to accept said engagement member without contact at said first position.

12. A method of installing an air bag module (24) in a vehicle steering wheel comprising the steps of:
   (1) locating a fastener (18) having a first substantially annular segment (40) and a locking segment (44) in a vehicle steering wheel (20), such that said first substantially annular segment (40) is located adjacent a receiver (16) within said vehicle steering wheel (20);
   (2) locating an engagement member (14) extending from an air bag module (12) through said receiver (16) and said first substantially annular segment (40); and
   (3) sliding said fastener (18) substantially transverse to said engagement member (14) to engage said locking segment (44) with said engagement member (14).

13. A method as set forth in claim 12, wherein in step (2), said engagement member is received without contact in said first substantially annular segment at step (2).

14. A method as recited in claim 12, wherein step (3) further comprises engaging said locking segment (44) with a slot (38) formed in said engagement member (14).

15. A vehicle steering wheel assembly (20), comprising:
   a steering wheel (20) including a hub (24) having a cavity (30);
   an air bag module (24) at least partially receivable within said cavity (30);
   an engagement member (14) extending from said air bag module (24);
   a receiver (16) located within said cavity (30) for receipt of said engagement member (14); and
   a fastener (18) being linearly slidable between a first position and a second position relative to said receiver (16), said fastener (18) providing a clearance to accept said engagement member (14) when located at said first position and said fastener (18) retaining said engagement member (14) when located at said second position to lock said air bag module (24) to said receiver (16).

16. The air bag assembly (10) as recited in claim 15, wherein said receiver (16) defines an axis, said fastener (18) slidable substantially transverse to said axis.

17. The air bag assembly (10) as recited in claim 15, wherein said fastener (18) includes a pair of parallel wires (38), said parallel wires (38) defining a first substantially annular segment (40), a second substantially annular segment (42), and a locking segment (44) therebetween.

18. The air bag assembly (10) as recited in claim 15, wherein a first substantially annular segment (40) provides a clearance to receive said engagement member (14) when located in said first position and said locking segment (44) engages said groove (32) when located in said second position.

19. The air bag assembly (10) as recited in claim 17, wherein said fastener (18) is retained in said first position and said second position by interaction between said second substantially annular segment (42) and a pair of protrusions (49) adjacent said fastener (18).

20. The air bag assembly (10) as recited in claim 15, wherein said engagement member (14) includes a groove (32) to receive said locking segment (44) of said fastener (18) when said fastener (18) is located in said second position.

21. The air bag assembly (10) as recited in claim 15, wherein said fastener (18) includes a pair of parallel wires (38).

22. The air bag assembly (10) as recited in claim 21, further comprising a first guide slot (46a) and a second guide slot (46b), said fastener (18) guided through each of said first (46a) and second (46b) guide slots, such that said fastener (18) is located adjacent said receiver (16).

23. The air bag assembly (10) as recited in claim 22, further comprising a divider (48) located adjacent each of said first (46a) and second (46b) guide slot, said divider (48) located between said pair of wires (38).

24. A vehicle steering wheel assembly as recited in claim 15, wherein said fastener providing said clearance, to accept said engagement member without contact at said first position.

25. An attachment arrangement assembly, comprising:
   an engagement member (14) extending from a first component;
   a receiver (16) in a second component for receipt of said engagement member (14); and
   a fastener (18) being linearly slidable between a first position and a second position relative to said receiver, said fastener (18) provides a clearance to accept said engagement member (14), and said fastener (18) retaining said engagement member (14) when located at said second position to lock said first component to said second component.

26. The attachment arrangement assembly as recited in claim 25, wherein said engagement member (14) includes a groove (38) to receive said fastener (18) when said fastener (18) is located in said second position.

27. The attachment arrangement assembly as recited in claim 25, wherein said fastener (18) includes a pair of parallel wires (38).

28. The attachment arrangement assembly as recited in claim 27, further comprising a first guide slot (46a) and a second guide slot (46b), said fastener (18) guided through each of said first (46a) and second (46b) guide slots such that said fastener (18) is located perpendicular to said receiver (16).

29. The attachment arrangement assembly as recited in claim 25, wherein said fastener (18) includes a pair of parallel wires (38), said parallel wires (38) defining a first substantially annular segment (40), a second substantially annular segment (42), and a locking segment (44) therebetween.

30. The attachment arrangement assembly as recited in claim 29, wherein said fastener (18) is retained in said first position and said second position by interaction between said second substantially annular segment (42) and a pair of protrusions (49) adjacent said fastener (18).

31. The attachment arrangement assembly as recited in claim 30, wherein said first substantially annular segment (40) provides a clearance to receive said engagement member (14) when located in said first position and said locking segment (44) engages said groove (38) when located in said second position.

32. The attachment arrangement assembly as recited in claim 25, wherein said first component is an air bag module (12).

33. The attachment arrangement assembly as recited in claim 25, wherein said second component is a vehicle steering wheel (20).

34. An attachment arrangement as recited in claim 25, wherein said fastener will receive said engagement member without contact at said first position.

35. A method of removably installing a first component to a second component comprising the steps of:

(1) locating a fastener (18) having a first substantially annular segment (40) and a locking segment (44) in a first component such that said first substantially annular segment (40) is located adjacent a receiver (16) within said second component;

(2) locating an engagement member (14) extending from said second component through said receiver (16) and said first substantially annular segment (40); and (3) sliding said fastener (18) substantially transverse to said engagement member (14) to engage said locating segment (44) with said engagement member (14).

36. A method as recited in claim 35, wherein step (3) further comprises engaging said locking segment (44) with a slot (38) formed in said engagement member (14).

37. A method as set forth in claim 35, wherein said engagement member is received in said first substantially annular segment without contact during step (2).

* * * * *